Sept. 23, 1924.
J. B. KINSER
1,509,358
TIRE CHAIN FASTENER
Filed June 11, 1923
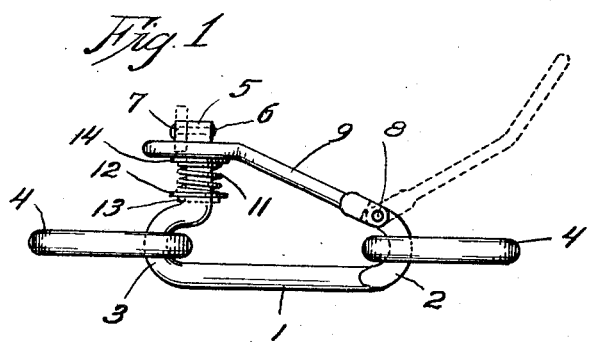
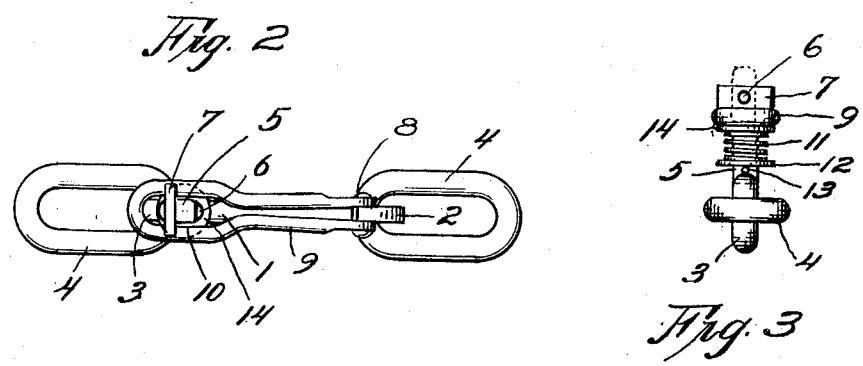
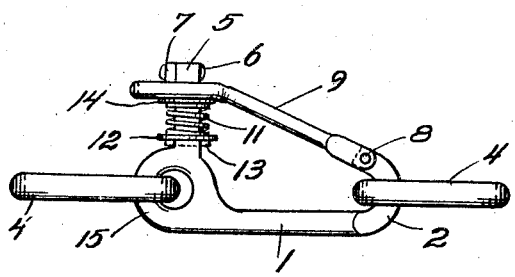
Witness:
R. E. Hamilton
Inventor:
J. B. Kinser,
By Thorpe & Levard
Attys.

Patented Sept. 23, 1924.

1,509,358

UNITED STATES PATENT OFFICE.

JAMES B. KINSER, OF TULSA, OKLAHOMA.

TIRE-CHAIN FASTENER.

Application filed June 11, 1923. Serial No. 644,658.

*To all whom it may concern:*

Be it known that I, JAMES B. KINSER, a citizen of the United States, and resident of Tulsa, county of Tulsa, State of Oklahoma, have invented a certain new and useful Improvement in Tire-Chain Fasteners, of which the following is a complete specification.

This invention relates to tire chain fasteners and my object is to produce a device of the character set forth which may be positively locked to prevent the accidental disengagement of one end of the chain from the fastener and the consequent loss of such chain, irregardless of whether or not the chain has been drawn tight.

Another object is to produce a fastener which is so formed as to provide a lever which may be utilized in tightening the chain around the tire.

A further object is to provide a tire chain fastener which is readily interchangeable for use on other chains.

A still further object is to produce a fastener of the type set forth which is of strong, durable, efficient and inexpensive construction; and in order that it may be fully understood, reference is to be had to the accompanying drawing, in which:—

Figure 1 is a side elevation of a fastener embodying the invention, and illustrates the opposite ends of a tire chain secured thereto;

Figure 2 is a top plan view of the same;

Figure 3 is an end view of the same; and

Figure 4 is a side elevation of a modified form of fastener which is adapted to be permanently secured at one end of a tire chain.

In the said drawing, where like reference characters identify corresponding parts in all of the figures, 1 illustrates the body of the fastener, said member being curved at its ends as at 2 and 3 to provide suitable hooks for engagement with the opposite ends 4 of a tire chain.

Hook 2 of the body of the fastener is preferably flattened at its opposite sides for a purpose which will hereinafter appear. The end of the body member 1 adjacent the hook 3 extends at right angle to the main portion of said member and forms a stem 5 for engagement with a part hereinafter identified and is provided at its upper end with a pin 6 forming a journal for a locking lug 7.

Fitting against opposite sides of the hook 2 of the body member and pivoted on a pin 8 carried thereby, is a bifurcated locking lever 9, being formed at its end with a rectangular opening 10 of sufficient width to snugly receive the stem 5 of the member 1, said lever 9 being preferably formed of a single length of wire bent to the form above-outlined. The lever 9 is engaged with stem 5 after the locking lug 7 has been rotated to occupy a parallel position as regards the stem, see the dotted lines in Figures 1 and 3, the lever being swung downwardly sufficiently to allow the locking lug 7 to be rotated to its full line position, thus bridging the opening 10 formed in the lever and preventing accidental unlocking movement of the fastener, as will be readily understood.

In order to insure against the accidental rotation of the locking lug 7, an expansion spring 11 encircles the stem 5 and presses at one end against a washer 12 held in position by means of a pin 13, and at its other end against a washer 14, which, when the lever 9 is in closed position, will press against said lever, and consequently against the locking lug 7 and efficiently maintain same against acidental rotation. When the lever 9 is disengaged from the stem 5, the expansion spring 11 will be held against dislodgment through the abutment of its washer 14 against the locking lug 7.

The device as illustrated in Figure 4 is identical in all particulars to the device as above-described, except the hook end 3 is in the form of a closed eye 15, to which one end of the tire chain is permanently secured.

In the operation of the device, as illustrated in Figure 1, the fastener is opened as shown by the dotted lines, and one end 3 of the tire chain is threaded over the body of the fastener by slipping a link thereof over the lever 9 until it attains the hook 3 of the body member. The chain is now placed on the tire and one of the links of the free end thereof is slipped over the lever 9. Manual force is now employed to pivot the lever, it being evident that pending this closing movement the chain may be tightened, as it will follow the lever in its pivoting action and will at the same time slide down said lever until it is engaged in the hook 2 of the member 1.

The opening 10 of the lever 9 is now engaged over the locking lug 7 which is standing parallel to the stem 5, and is forced downwardly on said stem against the action of the spring 11 until sufficient space has been provided for the rotation of the locking lug 7 to its horizontal position. The pressure of the lever will now be relieved and the spring 11 will force it firmly against the locking lug and will thereby hold same against accidental turning movement. The operations above-described are reversed when it is desired to remove the chain from the wheel.

From the above description, it will be apparent that I have produced a device of the character described, which possesses all of the features of advantage set forth as desirable, and while I have described and claimed the preferred embodiment of the same, I reserve the right to make all changes properly falling within the spirit and scope of the appended claims.

I claim:

1. A locking hook comprising a body member formed at one of its ends with a stem portion, a locking lever pivoted to the other end of said hook and having an opening in its free end adapted for reception of said stem portion, and a lug rotatably secured to the end of said stem portion and adapted for longitudinal alinement therewith in one position to pass through the opening in the locking lever and in its other position to prevent disengagement of said locking lever from said stem.

2. A locking hook comprising a body member formed at one of its ends with a stem portion, a locking lever pivoted to the other end of said hook and having an opening in its free end adapted for reception of said stem portion, a lug rotatably secured to the end of said stem portion and adapted in one position to pass through the opening in the locking lever and in its other position to prevent disengagement of said locking lever from said stem, and yielding means carried by said stem for exerting pressure on said locking lever when in locked position to maintain same against the locking lug to guard against rotation of the latter.

In witness whereof I hereunto affix my signature.

JAMES B. KINSER.